(12) United States Patent
Baker et al.

(10) Patent No.: US 11,314,770 B2
(45) Date of Patent: Apr. 26, 2022

(54) DATABASE MULTIPLEXING ARCHITECTURES

(71) Applicant: salesforce.com, inc., San Francisco, CA (US)

(72) Inventors: Gary Baker, South Lake Tahoe, CA (US); Scott Hansma, San Francisco, CA (US); Christopher Wilson Kifuthu, Berkeley, CA (US)

(73) Assignee: salesforce.com, Inc., San Francisco, CA (US)

( * ) Notice: Subject to any disclaimer, the term of this patent is extended or adjusted under 35 U.S.C. 154(b) by 253 days.

(21) Appl. No.: 14/307,301

(22) Filed: Jun. 17, 2014

(65) Prior Publication Data

US 2014/0372484 A1 Dec. 18, 2014

Related U.S. Application Data

(60) Provisional application No. 61/835,827, filed on Jun. 17, 2013.

(51) Int. Cl.
*G06F 16/27* (2019.01)
(52) U.S. Cl.
CPC .................................. *G06F 16/27* (2019.01)
(58) Field of Classification Search
CPC ................................ G06F 17/30; G06F 16/27
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |

(Continued)

*Primary Examiner* — Apu M Mofiz
*Assistant Examiner* — Farhad Agharahimi
(74) *Attorney, Agent, or Firm* — Kwan & Olynick LLP

(57) ABSTRACT

Techniques for database multiplexing. Within a group of two or more logical databases, each having a plurality of database nodes, the group of logical databases being part of a multitenant database environment that stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities, the tenant ID is used to determine a mapping between the tenant ID and one of the plurality of logical databases. A plurality of application servers coupled with two or more of the logical databases are used to service requests received from remote client device using the mapping to access a selected logical database corresponding to the tenant ID.

15 Claims, 4 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0049056 A1* | 2/2009 | Shutt ................. G06F 16/27 |
| 2010/0088636 A1* | 4/2010 | Yerkes ............... G06F 16/24 |
| | | 715/809 |
| 2010/0115095 A1* | 5/2010 | Zhu ................. H04L 67/12 |
| | | 709/226 |
| 2011/0307601 A1* | 12/2011 | Hogan ............... H04L 41/22 |
| | | 709/224 |
| 2011/0318011 A1* | 12/2011 | Brassil ............... G06F 15/16 |
| | | 398/82 |
| 2012/0016681 A1* | 1/2012 | Joergensen ......... G06F 11/3495 |
| | | 705/1.1 |
| 2012/0102067 A1* | 4/2012 | Cahill ................ G06F 16/27 |
| | | 707/770 |
| 2012/0254175 A1* | 10/2012 | Horowitz ............ G06F 16/278 |
| | | 707/737 |
| 2013/0238641 A1* | 9/2013 | Mandelstein ......... G06F 16/211 |
| | | 707/756 |
| 2013/0290249 A1* | 10/2013 | Merriman ............ G06F 16/273 |
| | | 707/610 |

* cited by examiner

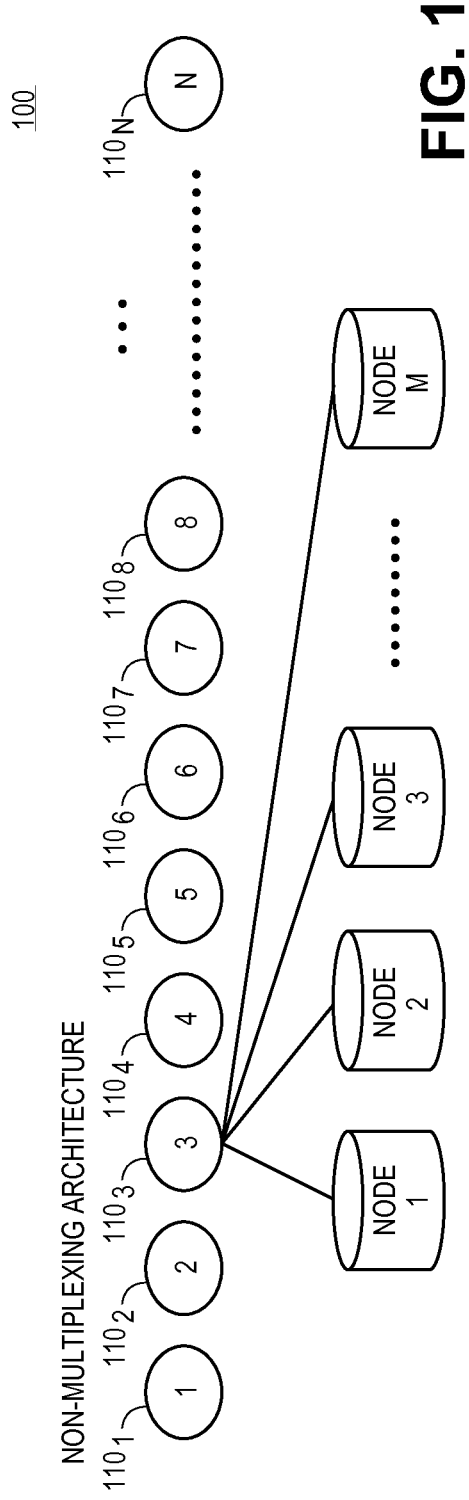
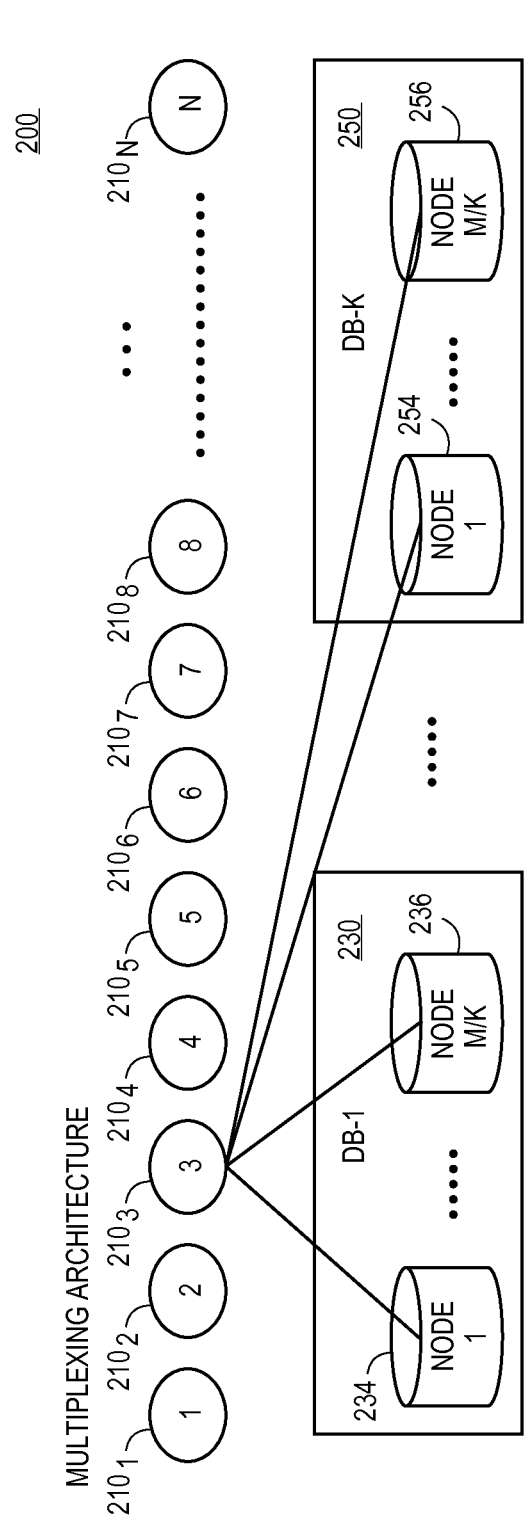

DATABASE MULTIPLEXING ARCHITECTURES

CLAIM OF PRIORITY

This application is related to, and claims priority to, the provisional utility application entitled "DATABASE MULTIPLEXING ARCHITECTURE," filed on Jun. 17, 2013, having an application number of 61/835,827, the entire contents of which is incorporated herein by reference.

TECHNICAL FIELD

Embodiments relate to database environment architectures. More particularly, embodiments relate to multiplexing database environment architectures.

BACKGROUND

Many systems use application servers ("app servers") to service requests by users in a cloud computing environment or on-demand services environment. However, under normal circumstances an app server only services one cluster of servers and one instance of a database.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a conceptual diagram of a non-multiplexing database environment.

FIG. 2 is a conceptual diagram of a multiplexing database environment.

DETAILED DESCRIPTION

Figure 3:
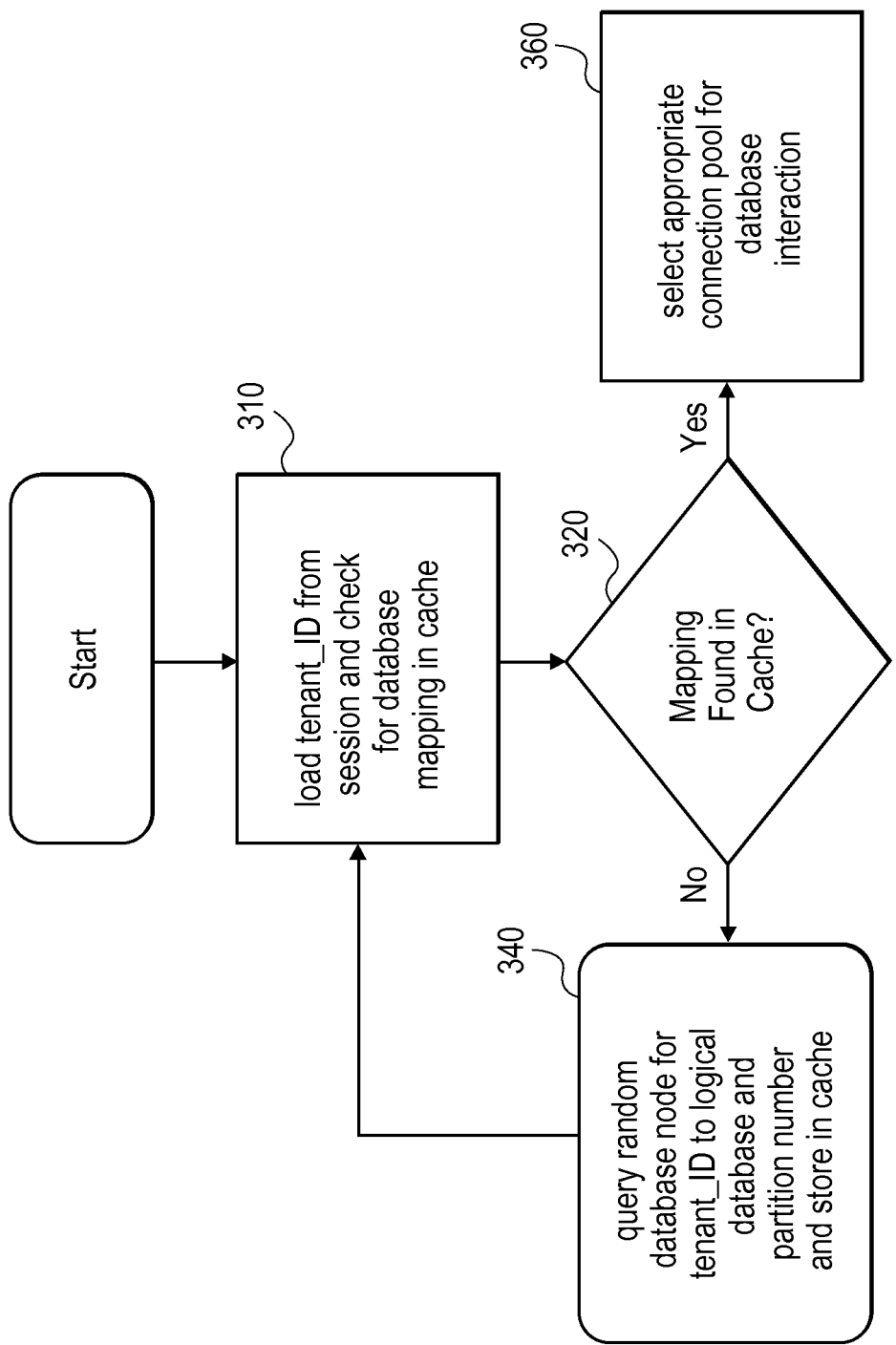
FIG. 3 is a flow diagram of one embodiment of a technique to determine an appropriate database in a multiplexing database architecture.

In the following description, numerous specific details are set forth. However, embodiments of the invention may be practiced without these specific details. In other instances, well-known structures and techniques have not been shown in detail in order not to obscure the understanding of this description.

As used herein, a "pod" is one or more databases, a collection of application servers and supporting services (e.g., search, binary storage) that services one or more tenants, but a tenant is not allowed to span multiple pods. For example, a pod can be one relational database system (e.g., an Oracle® database) that can be configured as a cluster (e.g., by Oracle's Real Application Cluster (RAC) architecture) across multiple (e.g., 8) physical devices. The techniques described herein allow the system to provide multiple logical databases within a pod without provisioning application servers. In one embodiment, both relational and non-relational databases can be supported using the architectures and techniques described herein.

An "application server" or "app server" is a program and/or supporting hardware that handles application operations between users and a database. An application server can be used, for example, for complex transaction-based applications. An application server can have built-in redundancy, monitor for high-availability, high-performance distributed application services and support for complex database access.

Described herein are systems and architectures that redesign app server architecture so that any given app server can serve requests for multiple database instances and multiple database servers. By doing so, the system could host multiple logical databases in a single pod, which has a number of benefits both in operational flexibility and resource utilization. For example, the benefits include improved operational support for database splits and improved resource utilization (both processor and other pod resources) and the possibility to scale a pod horizontally beyond what is normally supported (e.g., by Oracle's Real Application Cluster (RAC) architecture).

In practical terms, an Oracle database, for example, can become operationally unmanageable once it reaches a certain size (e.g., 30 TB of storage). Reaching this size limit is normally the driver for a database split, which results in a database being split, for example, along tenant lines. It is typical that that processor utilization on any given RAC node is not even close to reaching capacity when this storage threshold is reached.

In one embodiment, the techniques and architectures described herein can be provided within a multi-tenant database system. In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

FIG. 1 is a conceptual diagram of a non-multiplexing database environment. The example of FIG. 1 is that of a non-multiplexing architecture in which pod 100 has N app servers (e.g., $110_1 \ldots 110_N$), each coupled with one or more nodes (e.g., app server $110_3$ coupled with $Node_1 \ldots Node_M$). As the data managed by the nodes increases, the database can become operationally unmanageable.

FIG. 2 is a conceptual diagram of a multiplexing database environment. In the example multiplexing architecture of FIG. 2, pod 200 has N app servers (e.g., $210_k \ldots 210_N$), each coupled with one or more databases (e.g., 230, 250) that can include multiple nodes (e.g., 234, 236, 254, 256). As a practical example, in order to increase processor utilization in an eight-node cluster, the cluster can be split into two databases of four physical (e.g., RAC) nodes each. This way the system can handle as much as twice the capacity in terms of data size in a given pod without increasing the number of app servers or database machines. In one implementation, the system may require doing splits because it has reached processor utilization capacity instead of space capacity.

This architecture, in one embodiment, allows the system to split a pod that is reaching a threshold (e.g., a database of 30 TB) into two (or more) databases without actually moving the data or creating a new pod. Instead, in one implementation, the system splits the databases by data files and/or partitions and simply loads half of the partitions into one database and half into the other. As new data (e.g., new organizations with corresponding data) arrive in each database, the system can assign them organization identifiers (org ids) that place them in the "empty" partitions. Once a pod gets full of databases then the system can move one or more of the databases into a new pod.

This architecture allows the system to scale horizontally within a pod to many more nodes than can be supported by a single logical database. In addition, mega-pods can be created that have hundreds of database nodes and thousands of app servers. Currently, this is not possible because of the limited number of nodes that are supported by a single logical database.

In one implementation, the architecture may also implement changes to request lifecycles. For example, when processing a request, an app server may need to determine based on the user's session id, which database to use to service the request. Then the app server selects a connection from the appropriate pool for that logical database server.

In one embodiment, a background process that does not operate on an org-specific level may also be made database aware. This may require that the system have K such processes running and/or scheduled where K is the number of logical database servers in the pod.

FIG. 3 is a flow diagram of one embodiment of a technique to determine an appropriate database in a multiplexing database architecture. In one embodiment, in order to determine the appropriate database to service the request, an app server may check a cache of tenant_ID (and/or other information) to logical database/partition number, 310. If the cache is missed, 320, then a request can be made to any node in order to discover the correct mapping and populate the cache, 340. If the tenant_ID is found in the cache, 320, the app server may use the database server and partition mapping to select a connection to the appropriate node, 360.

In one implementation, the architecture may implement various types of background processes, for example, a background process that operates within the context of a tenant. In one embodiment a background process that operates inside the context of a tenant may have to determine which database the tenant utilizes. In one implementation, this is part of the request lifecycle described above in FIG. 3.

In one embodiment, background processes do not operate in the context of a tenant. For background processes that do not operate in the context of a tenant, one of the following two options can be utilized: 1) the process can be parameterized with the appropriate database identifier (then the process can be run and/or scheduled once for each database; or 2) the process can loop over each of the databases in the cluster and operate on each of them. The first option does not require that the process is aware of there being more than one database (i.e., that can be handled in the context of the scheduling framework).

In one embodiment, background processes are database instance aware. For example, background processes that are instance aware may be made aware that there are also multiple databases within an instance. Examples of these types of processes are: tenant migration, sandbox copy, replication, application deployment, and any process that shares data between organizations.

In a non-multiplexed database environment, there may be only one identifier to refer to both database and pod (e.g., the "server id" or the "server db id"). In one embodiment, to improve granularity and identify the database instance, the system can include the notion of "pod id" and "server id," which can become the identifier for a particular database within a pod. Alternatively, the system may include a "database id" and then server id may become the identifier only for the pod and not for a particular database.

In one embodiment, a distributed transactional cache infrastructure may be utilized that is spread across all of the app servers and or API servers in a pod. In one embodiment, the caches utilize data such as organization and user information, schema customizations, etc. As the number of databases and customers in the pod increases, this cache may become too large and inefficient. In one embodiment, for a pod with multiple databases that scale horizontally, the cache may be partitioned along database lines, or in another manner. This may utilize a separate physical or logical caching tier.

In one embodiment, the database environment deploys specialized servers called "search indexers" that analyze the data in the database(s) and organize it into search indexes which are then read by query servers that respond to client searches. In a non-multiplexed database embodiment, the search indexers assume that there is one database that they are responsible for. In a multiplexed database environment, the following options can be provided: 1) one indexer and a set of query servers to service an entire pod; 2) K indexers with one set of query servers to service the entire pod; or 3) K indexers with one set of query servers per database. In one embodiment, one search infrastructure is used per database. Alternatively, one search infrastructure could be used for an entire pod. In one embodiment, the database environment includes at least one search server, at least one application programming interface (API) server and at least one scheduler, all sharing a single code base.

Figure 4:
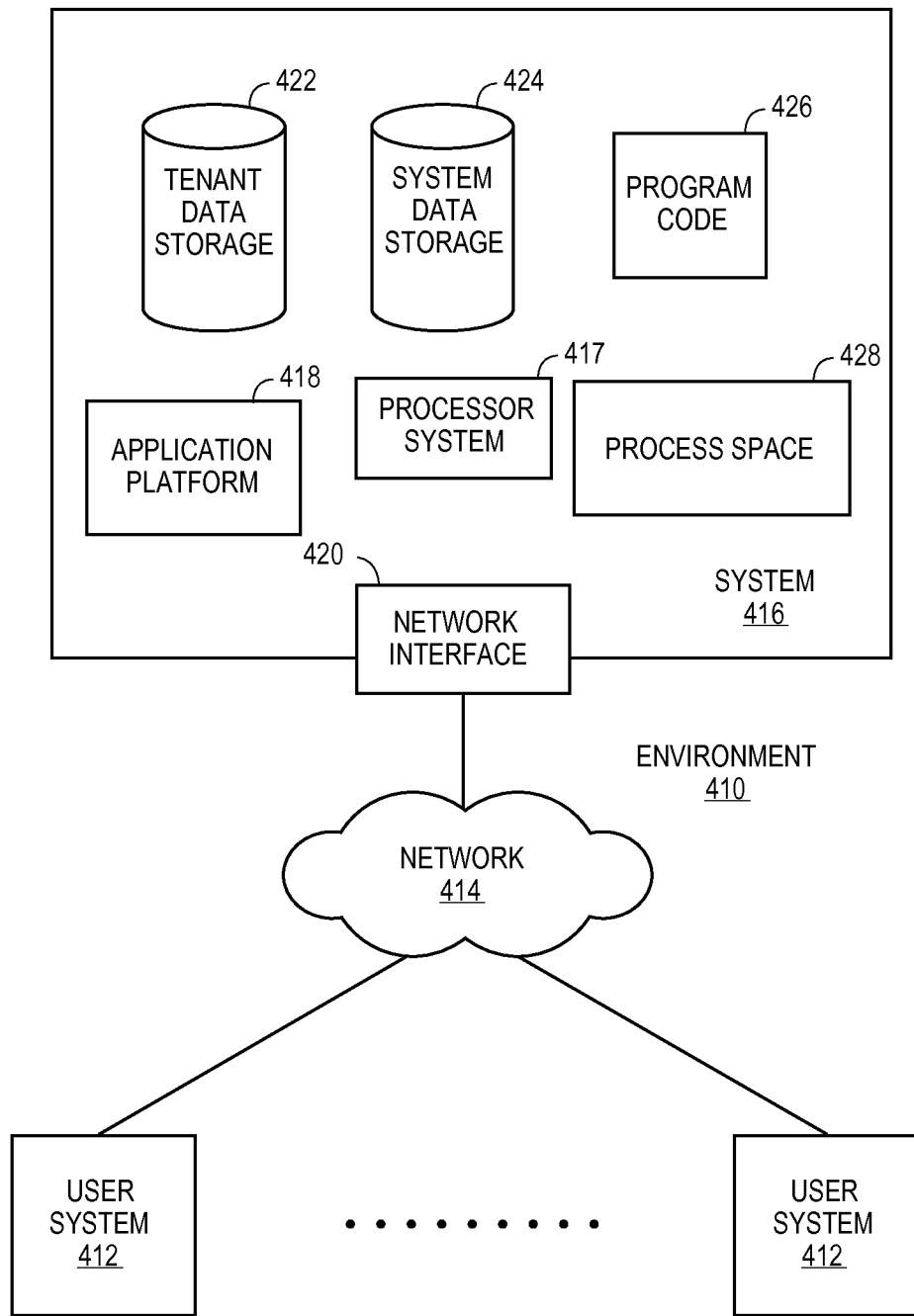
FIG. 4 is a block diagram of one environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
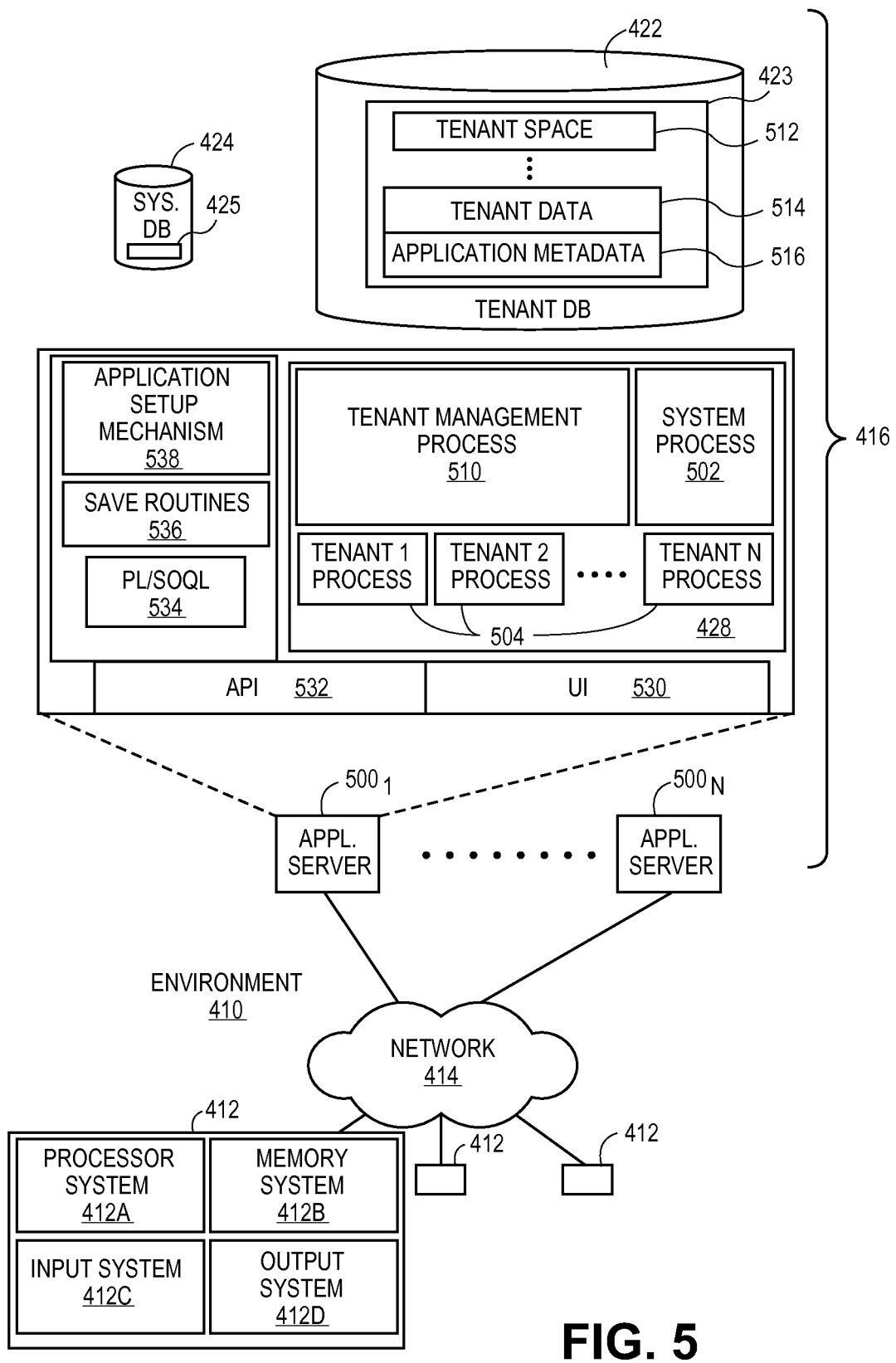
FIG. 5 is a block diagram of one embodiment of elements of environment of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers 500$_1$-500$_N$, system process space 502, tenant process spaces 504, tenant management process space 510, tenant storage space 512, tenant data 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage spaces 512, which can be either a physical arrangement and/or a logical arrangement of data. Within each tenant storage space 512, tenant data 514 and application metadata 516 might be similarly allocated for each user. For example, a copy of a user's most recently used (MRU) items might be stored to tenant data 514. Similarly, a copy of MRU items for an entire organization that is a tenant might be stored to tenant storage space 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A database system comprising:
a plurality of logical databases each supporting a fixed number of database nodes, the databases grouped as one or more pods, each pod having a plurality of database nodes and a plurality of application servers where the application servers each utilize multiple database nodes, the plurality of logical databases being part of a multitenant database environment that stores data for multiple client entities each identified by a tenant identifier (ID) having one of one or more users associated with the tenant ID, wherein users of each of multiple client entities can only access data identified by a tenant ID associated with the respective client entity and the plurality of logical databases comprising at least one relational database and at least one non-relational database;
the plurality of application servers coupled with two or more of the logical databases in a multiplexing architecture, each database having a plurality of database nodes, the plurality of application servers each configured to serve requests from multiple remote client devices for multiple database instances and multiple database nodes to support hosting multiple logical databases each having multiple nodes in a single pod, each of the plurality of application servers being configured to identify a node of a logical database to serve a request based on a tenant ID associated with each of the requests and a tenant ID mapping stored in a cache, the tenant ID mapping being configured to map a tenant ID to a logical database and a node;
a background process running on one or more hardware computing devices that also provides at least one of the plurality of application servers, the background process is not specific to any of the tenants of the multitenant database environment, wherein when one or more processors executing the plurality of application servers reach a pre-selected processor utilization threshold, the background process functions to split the database into two or more databases without user interaction and without moving the data out of the pod by splitting the databases by data files by loading a first portion of the files into a first database and a second portion into a second database independent of tenant ID, and as new tenants with corresponding data are added each database.

2. The database system of claim 1 wherein the two or more logical databases share a logical storage space.

3. The database system of claim 1 wherein a select logical database from the two or more logical databases operates as a master database in the multitenant database environment to maintain a cache of tenant information to be used to map tenants to logical databases.

4. The database system of claim 1 further comprising at least one search server, at least one application programming interface (API) server and at least one scheduler, all sharing a single code base.

5. The database system of claim 1 wherein the preselected threshold comprises a database size.

6. A method comprising:
within a group of two or more logical databases each supporting a fixed number of nodes organized as one or more pods, each logical database having a plurality of database nodes and a plurality of application servers where the application servers each utilize multiple database nodes, the group of logical databases being part of a multitenant database environment that stores data for multiple client entities each identified by a tenant identifier (ID) having one of one or more users associated with the tenant ID, wherein users of each of multiple client entities can only access data identified by a tenant ID associated with the respective client entity, using the tenant ID to determine a mapping between the tenant ID and one of the plurality of logical databases and the plurality of logical databases comprising at least one relational database and at least one non-relational database;
utilizing the plurality of application servers coupled with two or more of the logical databases in a multiplexing architecture, each database having a plurality of database nodes to service requests received from remote client device using the mapping to access a selected logical database corresponding to the tenant ID, the plurality of application servers each configured to serve requests from multiple remote client devices for multiple database instances and multiple database nodes to support hosting multiple logical databases each having multiple nodes in a single pod, each of the plurality of application servers identifying a node of a logical database to serve a request based on a tenant ID associated with the request and a tenant ID mapping stored in a cache, the tenant ID mapping being capable of mapping a tenant ID to a logical database and a node; and
executing a background process running on one or more hardware computing devices that also provide at least one of the plurality of application servers, the background process is not specific to any of the tenants of the multitenant database environment, wherein when one or more processors executing the plurality of application servers reach a pre-selected processor utilization threshold, the background process functions to split the database into two or more databases without user interaction and without moving the data out of the pod by splitting the databases by data files by loading a first portion of the files into a first database and a second portion into a second database independent of tenant ID, and as new tenants with corresponding data are added each database.

7. The method of claim 6 wherein the two or more logical databases share a logical storage space.

8. The method of claim 6 wherein a select logical database from the two or more logical databases operates as a master database in the multitenant database environment to maintain a cache of tenant information to be used to map tenants to logical databases.

9. The method of claim 6 further comprising at least one search server, at least one application programming interface (API) server and at least one scheduler, all sharing a single code base.

10. The method of claim 6 wherein the pre-selected threshold comprises a database size.

11. A non-transitory computer-readable medium having stored thereon instructions that, when executed by one or more processors, cause the one or more processors to:
within a group of two or more logical databases each supporting a fixed number of nodes organized as one or more pods, each logical database having a plurality of database nodes and a plurality of application servers where the application servers each utilize multiple database nodes, the group of logical databases being part of a multitenant database environment that stores data for multiple client entities each identified by a tenant identifier (ID) having one of one or more users associated with the tenant ID, wherein users of each of multiple client entities can only access data identified by a tenant ID associated with the respective client entity, using the tenant ID to determine a mapping between the tenant ID and one of the plurality of logical databases and the plurality of logical databases comprising at least one relational database and at least one non-relational database;

utilize the plurality of application servers coupled with two or more of the logical databases in a multiplexing architecture, each database having a plurality of database nodes to service requests received from remote client device using the mapping to access a selected logical database corresponding to the tenant ID, the plurality of application servers each configured to serve requests from multiple remote client devices for multiple database instances and multiple database nodes to support hosting multiple logical databases each having multiple nodes in a single pod, each of the plurality of application servers identifying a node of a logical database to serve a request based on a tenant ID associated with the request and a tenant ID mapping stored in a cache, the tenant ID mapping being capable of mapping a tenant ID to a logical database and a node; and execute a background process running on one or more hardware computing devices that also provide at least one of the plurality of application servers, the background process is not specific to any of the tenants of the multitenant database environment, wherein when one or more processors executing the plurality of application servers reach a pre-selected processor utilization threshold, the background process functions to split the database into two or more databases without user interaction and without moving the data out of the pod by splitting the databases by data files by loading a first portion of the files into a first database and a second portion into a second database independent of tenant ID, and as new tenants with corresponding data are added each database.

12. The computer-readable medium of claim 11 wherein the two or more logical databases share a logical storage space.

13. The computer-readable medium of claim 11 wherein a select logical database from the two or more logical databases operates as a master database in the multi tenant database environment to maintain a cache of tenant information to be used to map tenants to logical databases.

14. The computer-readable medium of claim 11 further comprising at least one search server, at least one application programming interface (API) server and at least one scheduler, all sharing a single code base.

15. The computer-readable medium of claim 11 wherein the pre-selected threshold comprises a database size.

* * * * *